(12) United States Patent
Louret et al.

(10) Patent No.: US 7,670,477 B2
(45) Date of Patent: Mar. 2, 2010

(54) DESULPHURIZATION PROCESS COMPRISING A TRANSFORMATION STEP AND A STEP FOR EXTRACTING SULPHUR-CONTAINING COMPOUNDS

(75) Inventors: Sylvain Louret, Lyons (FR); Florent Picard, Communay (FR)

(73) Assignee: Institut Francais du Petrole, Cedex Rueil Malmaison (FR)

( * ) Notice: Subject to any disclaimer, the term of this patent is extended or adjusted under 35 U.S.C. 154(b) by 269 days.

(21) Appl. No.: 11/643,945

(22) Filed: Dec. 22, 2006

(65) Prior Publication Data

US 2007/0170097 A1 Jul. 26, 2007

(30) Foreign Application Priority Data

Dec. 23, 2005 (FR) ................... 05 13226

(51) Int. Cl.
*C10G 45/00* (2006.01)
(52) U.S. Cl. .............. 208/95; 208/97; 208/208 R; 208/244; 585/271; 585/273; 585/274
(58) Field of Classification Search ............ 208/89, 208/97, 144, 208 R, 211, 237, 255, 46, 95, 208/244; 585/271, 273–274
See application file for complete search history.

(56) References Cited

U.S. PATENT DOCUMENTS 6,540,907 B1 * 4/2003 Towler et al. ............... 208/211

2003/0181772 A1 9/2003 Meyer et al.
2004/0030207 A1 * 2/2004 Ryu et al. .................. 585/261
2004/0094455 A1 5/2004 Picard et al.

* cited by examiner

*Primary Examiner*—Glenn A Caldarola
*Assistant Examiner*—Brian McCaig
(74) *Attorney, Agent, or Firm*—Millen, White, Zelano & Branigan, P.C.

(57) ABSTRACT

A process and the use of a process for desulphurizing a hydrocarbon feed is described which comprises at least one of the following steps:
A a step for selective hydrogenation of diolefins present in said initial hydrocarbon feed, in the presence of a catalyst comprising a metal from group VIII of the periodic table on an inert support based on metal oxides, in the presence of a quantity of hydrogen which is in excess with respect to the stoichiometric value necessary for hydrogenating all of said diolefins, the mole ratio between the hydrogen and the diolefins being in the range 1 to 5;
b) Extraction, using an appropriate solvent, of said hydrogenated fraction to obtain at least two cuts including:
  a raffinate comprising the majority of the olefins, paraffins and naphthenes and a reduced quantity of sulphur-containing compounds contained in the initial feed;
  a heavy fraction containing the heavy aromatic hydrocarbons and the majority of the sulphur-containing compounds contained in the initial feed;
C a step for regenerating the solvent by distillation;
at least two of steps A, B and C being carried out jointly.

14 Claims, 1 Drawing Sheet

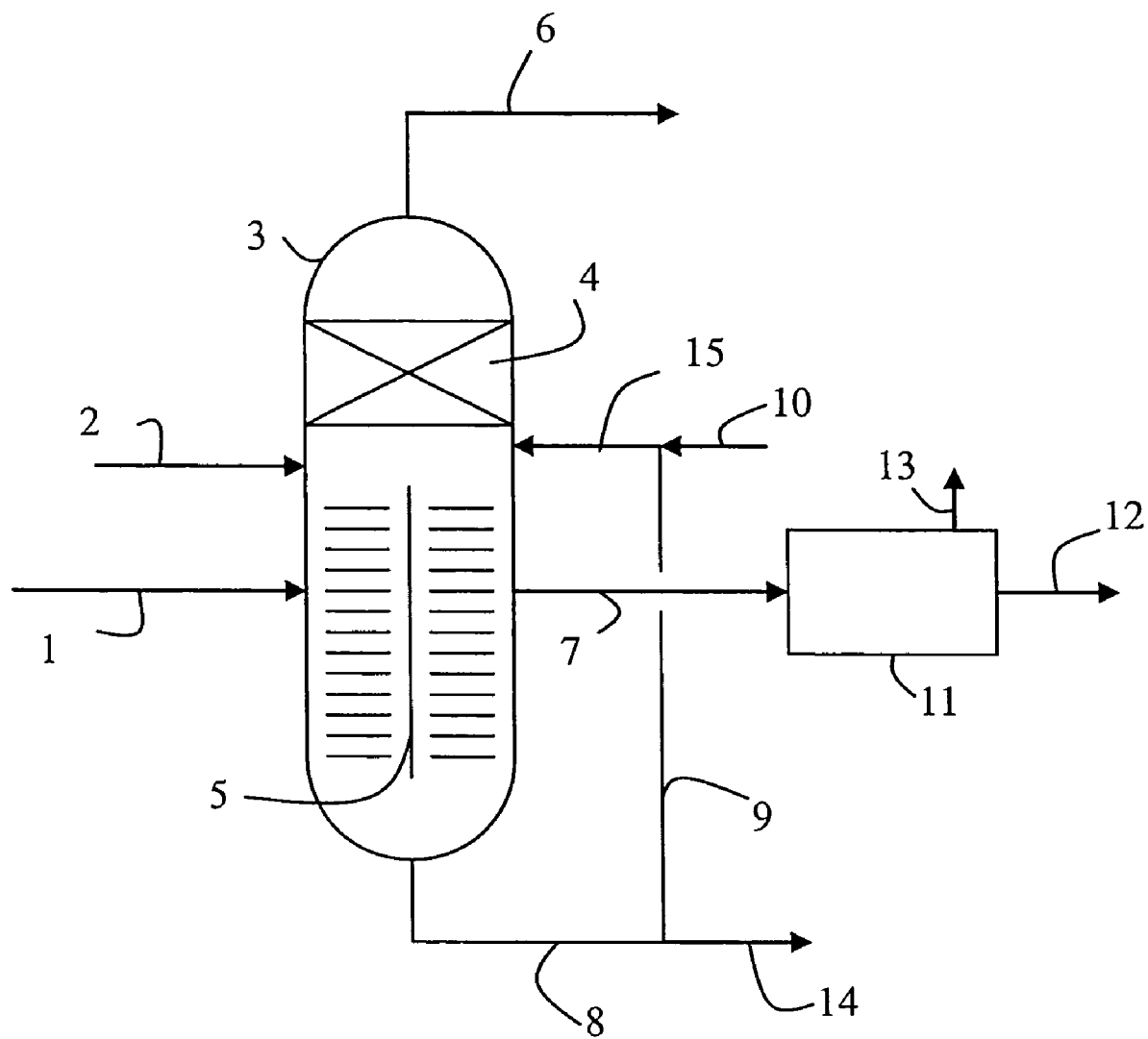

DESULPHURIZATION PROCESS COMPRISING A TRANSFORMATION STEP AND A STEP FOR EXTRACTING SULPHUR-CONTAINING COMPOUNDS

The present invention relates to a process for reducing the amount of sulphur and aromatic compounds generally contained in hydrocarbons and more particularly in gasolines.

Specifications regarding vehicle fuels envisage a large reduction in the sulphur content in said fuels, in particular in gasolines. This reduction is intended in particular to limit the amounts of oxides of sulphur and nitrogen in vehicle exhaust gas. European legislation lays down specifications for gasoline fuels which from 2005 are 50 ppm of sulphur and 35% of aromatics. In order to satisfy those specifications, it is necessary to treat the gasoline to reduce the sulphur content and in certain cases to use a treatment intended to control the amount of aromatic compounds and in particular benzene.

Thus, reducing the amount of sulphur and aromatic compounds in fuels requires the development of novel processes for deep desulphurization and for extracting aromatic compounds.

The principal sources of sulphur in gasoline bases are cracking gasolines, principally the gasoline fraction from a process for catalytically cracking a residue from atmospheric or vacuum distillation of a crude oil. The gasoline fraction derives from catalytic cracking, which represents on average 40% of the gasoline stock, contributes more than 90% of the sulphur in the gasoline. As a result, the production of low sulphur gasolines necessitates a step for desulphurizing catalytically cracked gasoline. Other sources of sulphur rich gasoline which may be cited are coking gasoline or, to a lesser extent, gasolines from atmospheric distillation, steam cracking gasoline or gasoline from a visbreaking process. The present invention is of particular application in the treatment of a gasoline cut from a catalytic cracking unit with a boiling point range extending from the boiling points of hydrocarbons containing 4 carbon atoms to 220° C., or from −15° C. to 220° C., or preferably from −10.2° C. (boiling point of isobutene) to 220° C. or, more preferably, from −5° C. to 220° C.

Further, the gasoline from catalytic cracking units generally contains between 20% by weight and 50% by weight of aromatic compounds and generally between 0.5% by weight and 5% by weight of benzene.

The desulphurization is conventionally carried out in one or more steps for bringing sulphur-containing compounds contained in said gasoline into contact with a hydrogen-rich gas in a process termed hydrodesulphurization in which organic sulphur is transformed into $H_2S$ (hydrogen sulphide) and separated from the gasoline. Current processes generally use a lot of hydrogen, especially when deep desulphurization is required.

A current approach consists, for example, of selecting a cut point for distillation of a FCC gasoline to obtain a light fraction containing a little sulphur and a heavier fraction containing the majority of heavy aromatic hydrocarbons as well as the majority of the sulphur-containing compounds. The cut point is generally selected so that the heaviest sulphur-containing compounds, for example thiophene derivatives, are primarily found in the heavy fraction. Said heavy fraction then supplies a hydrodesulphurization unit (HDS), in which the sulphur-containing compounds are eliminated by the action of a reducing stream, usually hydrogen. The major disadvantage of such a process, however, is the inevitable joint hydrogenation of the olefin present in said fraction. Preserving the octane number of gasoline during desulphurization steps necessitates limiting reactions involving the hydrogenation of olefins to paraffins as far as possible, which reactions are unfortunately inherent to hydrodesulphurization processes.

In summary, when the gasoline is desulphurized conventionally, the olefin saturation (or hydrogenation) reactions which occur in parallel to reactions for transforming sulphur-containing compounds into $H_2S$ inevitably result in a large drop in the octane number.

Of the other gasoline desulphurization pathways, solvent extraction processes may be used to produce a gasoline which is rich in olefins, paraffins and naphthenes (the fraction termed the raffinate) and also a gasoline which is rich in aromatic compounds and sulphur (the fraction termed the extract). U.S. Pat. No. 6,358,402 indicates how the solvent used for extractive distillation can be selected and optimized using a thermodynamic approach.

International patent application WO-A-01/59033 discloses a method for producing a desulphurized gasoline comprising a step for extracting sulphur-containing compounds intended to concentrate the sulphur-containing compounds in a fraction which is rich in aromatics and poor in olefins (the fraction termed the extract) and to recover a light fraction (the raffinate) containing a minor amount of sulphur. The extraction method used may be a liquid/liquid extraction or an extractive distillation. Said method should, according to the inventors, have better efficiency as regards sulphur-containing compound extraction. However, in view of the severity of the specifications described above, said method cannot reach sufficient degrees of desulphurization as a non negligible quantity of sulphur-containing compounds is contained in the raffinate.

Further, WO-A-97/08272 discloses a process for desulphurizing olefinic gasoline comprising a reactive distillation step. Said process is based on using a reactive column which contains, in the rectification zone, a catalyst which may react mercaptan type sulphur-containing compounds with diolefins to form sulphides entrained at the column bottom. The cut point of that reactive distillation column, however, is limited by the presence of aromatic sulphur-containing compounds such as thiophene.

In order to specifically extract the thiophene compounds, U.S. Pat. No. 6,540,907 proposes a desulphurization process using a distillation column with an internal wall which produces three cuts: a light cut containing hydrocarbons containing 5 carbon atoms and sulphur-containing compounds which are lighter than thiophene, principally in the form of mercaptans, an intermediate gasoline which concentrates hydrocarbons containing 6 to 7 carbon atoms and thiophene, and a heavy fraction which concentrates the heavy sulphur-containing compounds and which is low in olefinic compounds. The thiophene of the core fraction may be extracted by a complementary solvent treatment step.

Finally, US-2004/0094455 presents a process for eliminating at least part of the sulphur-containing compounds, diolefins and possibly aromatic compounds from olefinic gasolines based on a concatenation of selective hydrogenation steps and steps for extracting sulphur-containing compounds and aromatic compounds by a solvent treatment.

The present invention proposes an improved process for desulphurizing a hydrocarbon feed, for example a gasoline feed, comprising the following steps:

A a step for transforming saturated sulphur-containing compounds which are lighter than thiophene by bringing the gas into contact with a catalyst comprising a metal from group VIII in the presence of hydrogen;

B a step B for solvent extraction of said hydrogenated fraction to obtain at least two cuts including:
   a raffinate comprising the majority of the olefins, paraffins and naphthenes and a reduced quantity of sulphur-containing compounds contained in the initial feed;
   a heavy fraction containing the heavy aromatic hydrocarbons and the majority of the sulphur-containing compounds contained in the initial feed;
C a step for regenerating the solvent by distillation.

The term "majority of the olefins, paraffins and naphthenes" as used in the present description means that the amount by weight of these families of hydrocarbons is 50% or more, preferably 70% or more and more preferably 80% or more. The term "reduced quantity of sulphur-containing compounds" as used in the present description means that the total quantity of sulphur is less than 20%, preferably less than 10% and more preferably less than 5% of the total quantity of sulphur present in the initial feed.

At least two of steps A, B and C are carried out jointly.

Steps A and B may be carried out jointly in a reactive column in which the catalyst comprising a group VIII metal which can transform sulphur-containing compounds into heavier compounds is used in the rectification section of the distillation column and the solvent used to extract the aromatic sulphur-containing compounds is injected into the column onto a plate located beneath the catalytic zone.

Solvent regeneration step C may be carried out jointly with step B in a column with internal walls.

Steps A B and C may be carried out jointly in a column for reactive and extractive distillation with internal walls.

The energy balance shows that carrying out the process of the invention can save energy and thus is highly interesting from an industrial viewpoint.

The invention will be better understood from the following description of an implementation of the invention. However, the present invention is not limited to this particular implementation.

Step A is carried out by bringing the gasoline to be treated into contact with hydrogen over a catalyst comprising at least one group VIII metal and can transform light sulphur-containing compounds, selected from a list constituted by mercaptans, sulphides and $CS_2$ with a boiling point which is generally lower than that of thiophene, into heavier sulphur-containing compounds with a boiling point which is higher than that of thiophene. Said transformation reactions are carried out either by direct addition of mercaptans to the unsaturated compounds present in the feed and principally to the olefins, generally termed thioetherification, or by a succession of a first step for hydrogenolysis of the carbon-sulphur bond by hydrogen, then by addition of the compound formed to olefins.

Concomitantly with transformation of the sulphur-containing compounds into heavier compounds, partial hydrogenation of diolefins present in the feed into olefins may be observed, as well as isomerization of the position of the double bond in the olefins.

This step is carried out in the presence of a catalyst comprising at least one group VIII metal, preferably selected from the group formed by platinum, palladium and nickel, and an inert support based on metal oxides. As an example, a catalyst containing 1% to 20% by weight of nickel deposited on an inert metal oxide-based support such as alumina, silica, silica-alumina, a nickel aluminate or a support containing at least 50% alumina may be used. Said catalyst generally operates at a pressure of 0.2 to 5 MPa, at a temperature of 50° C. to 300° C., with an hourly space velocity of the feed of 1 $h^{-1}$ to 12 $h^{-1}$. Another metal from group VIB such as molybdenum or tungsten may be associated to form a bimetallic catalyst. Said group VIB metal, if it is associated with the group VIII metal, may be deposited on the support in an amount of 1% by weight to 20% by weight. When the metal used is palladium, it is used in the reduced form, but when the metal used is nickel, molybdenum or tungsten, it is used in the sulphurized form.

The choice of operating conditions is particularly important. In general, the operation is carried out under pressure in the presence of a quantity of hydrogen which is in slight excess with respect to the stoichiometric value required to hydrogenate the diolefins present in the feed. The term "slight excess" as used in the present description means that the mole ratio between the hydrogen and the diolefins is in the range 1 to 5, preferably in the range 1.2 to 3 and more preferably in the range 1.4 to 2.5. The quantity of hydrogen is selected to maximize the transformation of sulphur-containing compounds into heavier compounds, optionally to selectively hydrogenate the diolefins present in the feed and to limit deactivation of the catalyst by polymer formation.

More generally, the temperature is in the range 50° C. to 300° C., preferably in the range 80° C. to 250° C., and more preferably in the range 100° C. to 210° C.

The space velocity under these conditions is in the range 1 to 12 $h^{-1}$, preferably in the range 2 to 10 $h^{-1}$.

Step A is carried out in the rectification zone of a catalytic column to treat only the lightest fraction of the gasoline. This implementation can improve the activity and stability of the catalyst. In this case, the heavy sulphur-containing compounds and the gums and other contaminants which may be present in the feed to be treated tend to become concentrated in the heavy fractions and are thus not sent to the catalyst for step A. In this implementation, the pressure of the column will be adjusted so that the catalyst functions at a temperature in the range 50° C. to 300° C., preferably in the range 80° C. to 250° C., and more preferably in the range 100° C. to 210° C.

Gasoline treatment step B consists of bringing the gasoline to be treated into contact in a distillation column with a heavy organic solvent, also termed an entrainer, which has a high affinity for aromatic sulphur-containing compounds, principally thiophene and methyl thiophenes as well as for aromatic hydrocarbons. Introducing the entrainer into the column has the principal result of modifying the relative volatilities of the constituents of the feed. The entrainer is in principle a solvent with a boiling point which is higher than the constituents of the feed. It entrains with it sulphur-containing compounds and aromatics. The mixture constituted by the entrainer, aromatic sulphur-containing compounds and aromatic hydrocarbons is termed the extract.

The solvents which are generally used in the context of the present invention are selected as a function of their affinity for aromatic compounds and sulphur-containing compounds. They allow the sulphur-containing compounds to be extracted from the feed by concentrating them in the extract while discharging the olefins in the raffinate. The selectivity and solvent power (solubility of compounds in said solvent) as regards the sulphur-containing compounds and aromatics are the two principal characteristics required for the choice of solvent. The solvent is in particular selected as a function of criteria which are well known to the skilled person, for example in accordance with the principles described in U.S. Pat. No. 6,358,402 and preferably will have a high boiling point to limit solvent loss due to volatility and to reduce degradation of said solvent in the regeneration column.

Further, the non exhaustive list below furnishes a series of solvents which may be used to carry out said separation:

sulpholane, 3-methylsulpholane, 2,4-dimethylsulpholane, 3-methylsulpholane, 3-ethylsulpholane, N-methylpyrrolidone, 2-pyrrolidone, N-ethylpyrrolidone, N-propylpyrrolidone, N-formylmorpholine, dimethylsulphone, diethylsulphone, methylethylsulphone, dipropylsulphone, dibutylsulphone, tetraethylene glycol, triethylene glycol, dimethylene glycol, diethylene glycol, ethylene glycol, ethylene carbonate and propylene carbonate.

Recommended preferred solvents are sulpholane, 3-methylsulpholane, N-formylmorpholine, 2-pyrrolidone, dipropylsulphone and tetraethylene glycol.

The entrained sulphur-containing compounds and aromatics are recovered during regeneration step C. Step C consists of conventional distillation to extract the aromatics and sulphur-containing compounds initially present in the extract overhead and the selected solvent from the bottom. This is selected so that its boiling point is higher than the end point for distillation of the treated feed (extract).

The process and facility of the invention will be better understood from the description below made with reference to FIG. 1.

The feed to be treated 1 is injected into a reactive extractive distillation column 3. Step A is carried out by bringing the feed to be treated 1 into contact with hydrogen 2 on a catalytic bed 4. Step B consists of bringing the gasoline to be treated into contact with a heavy organic solvent, also termed an entrainer, with a strong affinity for aromatic sulphur-containing compounds. The entrainer used to extract the aromatic sulphur-containing compounds is injected into the column onto a plate located beneath the catalytic zone via a line 15. It is recycled, 9, and a makeup 10 of fresh entrainer is added. A purge is also carried out via a line 14. Solvent regeneration step C is carried out jointly with steps A and B, in a column with internal walls 5. This column can produce three fractions: a light fraction 6 which is depleted in sulphur principally containing olefins and paraffins, an intermediate fraction 7 containing the sulphur-containing compounds and the aromatic compounds, and a heavy fraction 8 principally containing entrainer. To be used, the core fraction must generally undergo a complementary desulphurization treatment 11 and preferably should undergo this treatment directly. This desulphurization can recover a desulphurized cut 12 and hydrogen sulphide $H_2S$, 13. It is possible to upgrade the desulphurized core fraction in a number of manners. Without limitation, this core fraction which is rich in aromatic compounds having a good octane number may either be mixed with the gasoline pool or sent to an aromatic complex to separate benzene, toluene, xylenes and other aromatic compounds which may, for example, be used separately as petrochemicals intermediates.

The following examples illustrate the invention without limiting its scope.

EXAMPLE 1 (PRIOR ART)

A gasoline containing 25% by weight of olefins, 1% by weight of diolefins and 450 ppm of sulphur (114 ppm of sulphur in the form of mercaptans and 336 ppm of sulphur in the form of thiophene compounds) is treated in a selective hydrogenation step A.

Hydrogen was added to this gasoline upstream of step A in a molar excess with respect to the quantity of diolefins. The mole ratio of hydrogen to diolefins was 1.5.

After separating the hydrogen in a gas/liquid separator, the effluent from the selective hydrogenation reactor (step A) was sent to a step B, separate from step A, for solvent extraction. This effluent contained 23.5% by weight of olefins and 450 ppm of sulphur (59 ppm of sulphur in the form of mercaptans and 392 ppm of sulphur in the form of thiophene compounds). All of the diolefins were hydrogenated.

Extraction was carried out using diethylene glycol in a plate column. The quantity of heat exchanged across the condenser of this column was 17.5 MW. The quantity of heat exchanged across the reboiler of this column was 21.4 MW.

The raffinate withdrawn from the condenser of the extraction column (step B) contained 10 ppm of sulphur, principally light mercaptans (less than 5 carbon atoms). The column raffinate/feed weight ratio was 0.26 by weight.

The extract withdrawn from the column bottom contained all of the solvent and the heavy aromatics. The sulphur content of the extract was 605 ppm. The column extract/feed ratio was 0.74.

The extract was sent to a solvent regeneration column (step C). The quantity of heat exchanged across the condenser of this column was 49.9 MW. The quantity of heat exchanged across the reboiler for this column was 46.7 MW.

The solvent was withdrawn from the bottom of this column and recycled to the extraction column (step B).

EXAMPLE 2 (IN ACCORDANCE WITH THE INVENTION)

A gasoline containing 25% by weight of olefins, 1% by weight of diolefins and 450 ppm of sulphur (114 ppm of sulphur in the form of mercaptans and 336 ppm of sulphur in the form of thiophene compounds) was treated in accordance with the invention.

The gasoline supplied a reactive extractive distillation column (see 3 in FIG. 1) to the region of the zone separated by an internal wall 5, towards the centre of said zone. Hydrogen was injected via line 2 to a plate located above the zone separated by an internal wall, located just below the plates containing the selective hydrogenation catalyst 4. Hydrogen was introduced in molar excess with respect to the quantity of diolefins to be hydrogenated. The mole ratio of hydrogen to diolefins was 1.5.

The solvent, diethylene glycol, was injected via line 15 into the part above the zone separated by an internal wall onto the plate below the hydrogen injection plate.

The quantity of heat exchanged across the condenser for this column was 46.5 MW. The quantity of heat exchanged across the reboiler for this column was 51.1 MW.

The raffinate extracted from the column condenser via line 6 contained 10 ppm of sulphur, principally light mercaptans (less than 5 carbon atoms). The column raffinate/feed weight ratio was 0.25.

The extract 7 withdrawn from the lower portion of the zone separated by the internal wall located on the other side of the wall with respect to injection of the feed contained 608 ppm of sulphur. The column extract/feed ratio was 0.75.

The solvent was extracted from the column bottom via line 8 and recycled via line 9.

The energy gain achieved using the process of the invention was 31% of the quantity of heat at the condenser and 25% of the quantity of heat at the reboiler.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 05/13.226, filed Dec. 23, 2005, is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for desuiphurizing a hydrocarbon feed comprising the following steps:
   A a step for selective hydrogenation of diolefins present in said initial hydrocarbon feed, in the presence of a catalyst comprising a metal from group VIII of the periodic table on an inert support based on metal oxides, in the presence of a quantity of hydrogen which is in excess with respect to the stoichiometric value necessary for hydrogenating the whole of said diolefins, the mole ratio between the hydrogen and the diolefins being in the range of 1 to 5;
   B extraction, using an appropriate solvent, of a hydrogenated fraction from step A to obtain at least two cuts including:
       a raffinate comprising the majority of the olefins, paraffins and naphthenes and a reduced quantity of sulphur-containing compounds contained in the initial feed;
       a heavy fraction containing the heavy aromatic hydrocarbons and the majority of the sulphur-containing compounds contained in the initial feed;
   C a step for regenerating the solvent by distillation;
steps A, B and C being carried out jointly in a column for reactive and extractive distillation having an internal wall.

2. A process according to claim 1, in which the mole ratio between the hydrogen and the diolefins is in the range of 1.2 to 3.

3. A process according to claim 1, in which said catalyst comprises at least one of platinum, palladium and nickel.

4. A process according to claim 1, in which said catalyst further comprises a metal from group VIB of the periodic table.

5. A process according to claim 1, in which said heavy fraction is treated in a hydrodesulphurization unit.

6. A process according to claim 1, in which said selective hydrogenation is carried out at a pressure of about 0.4 to 5 MPa, at a temperature in the range from about 50° C. to 300° C., with an hourly space velocity of the feed in the range of 1h$^{-1}$ to 12h$^{-1}$.

7. A process according to claim 1, in which said extraction is extractive distillation or liquid-liquid extraction.

8. A process according to claim 1, in which said solvent comprises at least one of: sulpholane, 3-methylsulpholane, 2,4-dimethylsulpholane, 3-methylsulpholane, 3-ethylsuipholane, N-methylpyrrolidone, 2-pyrrolidone, N-ethylpyrrolidone, N-propylpyrrolidone, N-formylmorpholine, dimethylsulphone, diethylsulphone, methylethylsuiphone, dipropylsulphone, dibutylsulphone, tetraethylene glycol, triethylene glycol, dimethylene glycol, diethylene glycol, ethylene glycol, ethylene carbonate and propylene carbonate.

9. A process according to claim 8, further comprising withdrawing said heavy fraction at a point in the column and withdrawing regenerated solvent at a point below the point of withdrawal of the heavy fraction.

10. A process according to claim 9, in which said heavy fraction is treated in a hydrodesulphurization unit.

11. A desulphurization process according to claim 1, in which said feed is a gasoline or a gasoline mixture derived from at least one process selected from fluidized bed cracking (FCC, steam cracking, cokefaction and visbreaking processes.

12. A process according to claim 1, in which said feed is a gasoline cut derived from a catalytic cracking unit with a boiling point range which extends from the boiling points of hydrocarbons containing 4 carbon atoms to 220° C.

13. A process according to claim 1, further comprising withdrawing said heavy fraction at a point in the column and withdrawing regenerated solvent at a point below the point of withdrawal of the heavy fraction.

14. A process according to claim 13, in which said heavy fraction is treated in a hydrodesulphurization unit.

* * * * *